May 17, 1932.   E. R. GURNEY   1,858,773
MULTIPLE TRANSMISSION SHAFT DRIVE FOR MOTOR VEHICLES
Filed Jan. 17, 1930   2 Sheets-Sheet 2
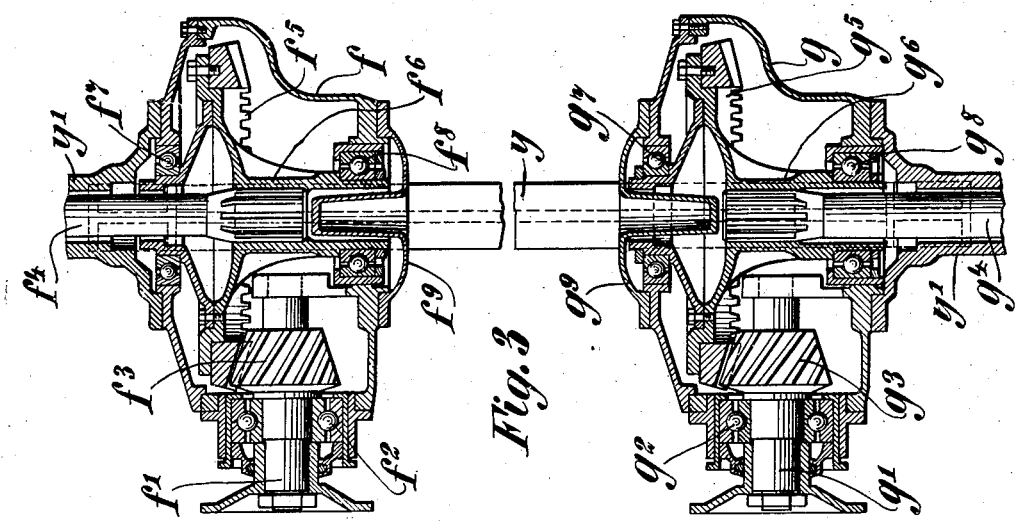
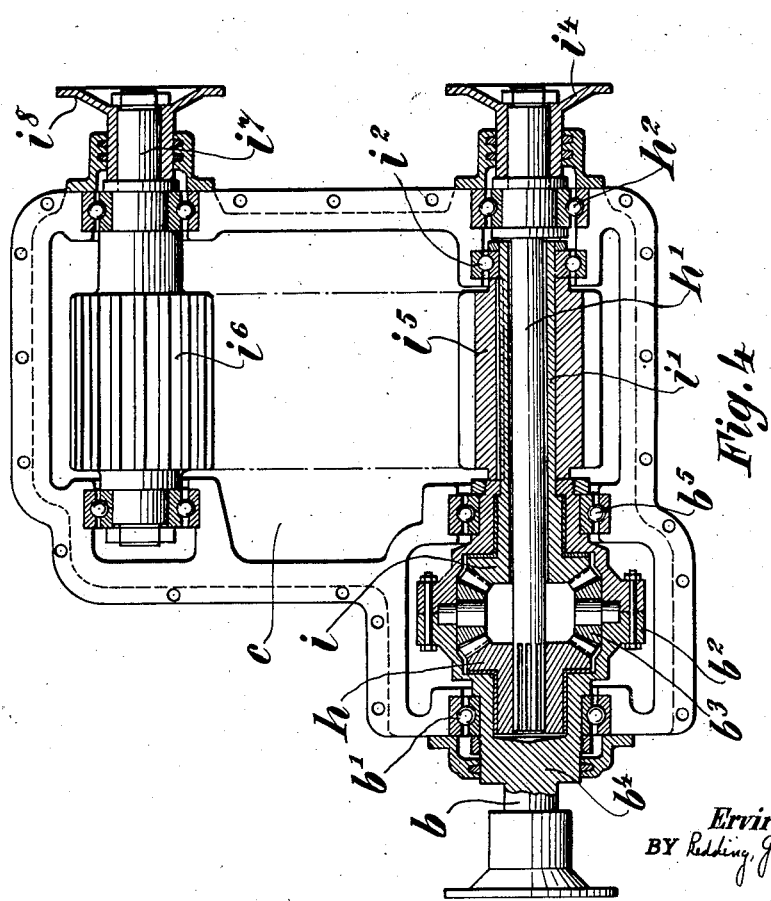
INVENTOR
Erving R. Gurney,
BY Redding, Greeley, O'Shea + Campbell
his ATTORNEYS Patented May 17, 1932

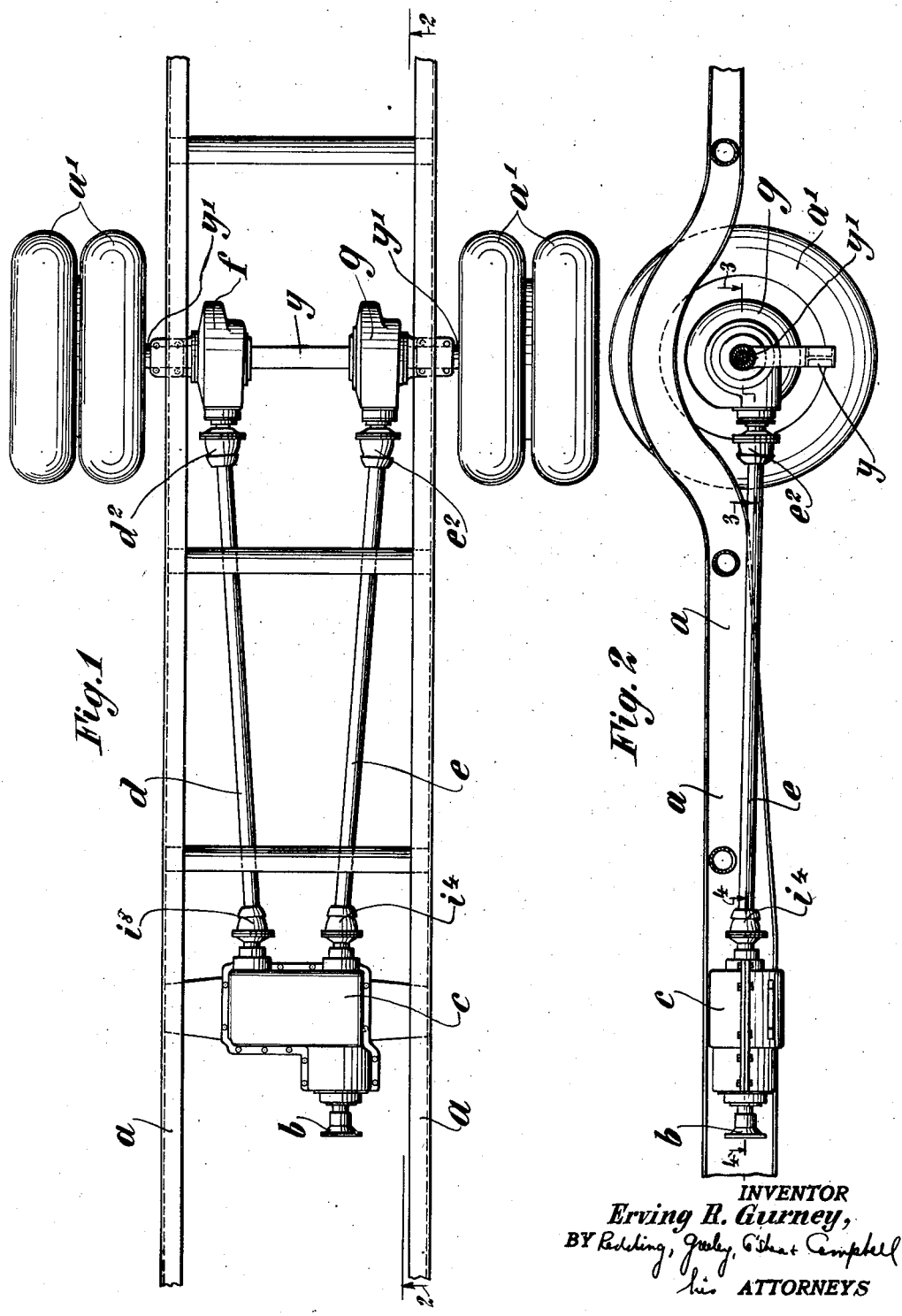

1,858,773

UNITED STATES PATENT OFFICE

ERVING R. GURNEY, OF ALLENTOWN, PENNSYLVANIA, ASSIGNOR TO INTERNATIONAL MOTOR COMPANY, OF NEW YORK, N. Y., A CORPORATION OF DELAWARE

MULTIPLE TRANSMISSION SHAFT DRIVE FOR MOTOR VEHICLES

Application filed January 17, 1930. Serial No. 421,420.

The present invention relates to drives for motor vehicles and embodies, more specifically, an improved drive by means of which the floor level of the body is lowered materially and is unobstructed throughout the portions thereof traversed by passengers. It is a matter of common knowledge that the clearance necessary for the differential housing at the rear of the vehicle materially increases the floor level and is quite objectionable in commercial vehicles where a center aisle is desirable. In certain types of vehicles this clearance may be provided for by mounting a transverse seat directly over the differential housing, but in large vehicles of the commercial type, this is not feasible. Accordingly, many designs have been suggested in an effort to overcome the difficulty mentioned above.

The present invention seeks to provide a vehicle chassis of such character that the irregularities in the floor surface occur at one side of the median line of the vehicle. Bearing in mind that a 20 inch aisle is a desirable minimum in commercial vehicle design, the problem confronting the designer is that of maintaining the floor surface smooth and unbroken for a width of 20 inches in the central portion of the vehicle throughout its length. The disposition of the rear differential must, therefore, be at least 10 inches from the center line of the frame and, where two final drives are used, they must be 20 inches apart between the adjacent portions of the projecting elements thereof. The present invention affords a low floor with no ramp therein to clear the differential by utilizing final drive units, one at either side of the frame and supplying power thereto from separate propeller shafts between which power is apportioned by a dividing unit forwardly of the frame and mounted as a sprung element thereon. The rear axle is underslung and dead, the jack shafts being journaled therein and driven from the respective final drives.

An object of the invention, accordingly, is to provide a vehicle construction in which the floor level is material lowered, no elevating ramp being required in that portion thereof occupied by the aisle to clear the final drives.

A further object of the invention is to provide a construction in which the driving elements of the respective final drives are of such character that complete interchangeability is afforded.

A further object of the invention is to provide a construction in which the take off gears and associated mechanism of the final drive are of such size that the projections required in the floor for clearance thereof are not only offset with respect to the aisle section of the floor but are unobjectionable in size.

Further objects, not specifically enumerated above, will be apparent as the invention is described in greater detail in connection with the accompanying drawings, wherein:

Figure 1 is a plan view of the chassis of a motor vehicle constructed in accordance with the present invention.

Figure 2 is a view in section, taken on line 2—2 of Figure 1, and looking in the direction of the arrows.

Figure 3 is a view in section, enlarged and in detail, and taken on line 3—3 of Figure 2 showing the final drives of the construction shown in Figure 1.

Figure 4 is a view in section, enlarged and in detail, and taken on line 4—4 of Figure 2 showing the elements of the means for apportioning power between the propeller shafts.

Referring to the above drawings, particularly Figures 1, 2, 3, and 4, $a$ designates the side frame members of a motor vehicle chassis carrying wheels $a'$, mounted in any desired manner. A shaft $b$ supplies power from an engine and transmission to a power apportioning device $c$, from which spaced propeller shafts $d$ and $e$ transmit the drive to final drives $f$ and $g$.

The rear axle $y$ is dead and is formed with a downward cast, as clearly shown in Figure 2, to permit the final drives $f$ and $g$ to be mounted coaxially with the hollow extensions $y'$ of the axle. These extensions serve as jack shaft housings and are journaled upon the springs in any well known fashion.

The power apportioning means $c$ is carried in a housing, as clearly shown, and receives power from shaft $b$ which is journaled in the housing at $b'$. This shaft extends within the housing and drives a carrier $b^2$, the pinion $b^3$ of which drives concentric opposed bevel gears $h$ and $i$. Bevel gear $h$ is mounted upon a shaft $h'$ which is journaled, at one end, in a cup-shaped recess $b^4$ in the shaft $b$, and at the other end at $h^2$ in the housing $c$.

The bevel pinion $i$ is preferably formed on a sleeve $i'$ which is journaled within the carrier $b^2$ and within a bearing $i^2$ in the housing $c$. The carrier $b^2$ is journaled, at its inner end, in the housing $c$ at $b^5$.

Shaft $h'$ is connected to a universal joint connection $i^4$ and pinion $i^5$ on sleeve $i'$ is connected by a silent chain drive to a pinion $i^6$ on shaft $i^7$. This shaft is connected to a universal joint connection $i^8$, and propeller shafts $d$ and $e$ are connected to the respective connections.

Similar universal joints $d^2$ and $e^2$ are mounted at the rearward extremities of the respective propeller shafts and drive shaft sections $f'$ and $g'$, respectively. These shafts are journaled at $f^2$ and $g^2$ in the respective final drive housings $f$ and $g$ and carry hypoid pinions $f^3$ and $g^3$. Jack shafts $f^4$ and $g^4$, mounted in the respective extremities $y'$ of the axle $y$ extend within the respective final drive housings and carry bevel gears $f^5$ and $g^5$. These bevel gears are mounted upon spiders $f^6$ and $g^6$, respectively, such spiders being formed in two parts and journaled in the respective final drive housings at $f^7$, $f^8$, and $g^7$, $g^8$.

To facilitate assembly and inspection, covers $f^9$ and $g^9$ are provided for the final drive housings and the housings are secured to the enlarged extremities $y'$ of the axle $y$.

It will be seen that complete interchangeability of parts is afforded in the final drives described above and, in order to secure the correct direction of rotation, the drive from the ends of the propeller shafts is taken from the same sides of the hypoid pinions, as viewed in plan in Figure 3.

From the foregoing description it will be seen that a central aisle portion is provided with an uninterrupted surface, the floor level being materially lowered with no elevated ramp to clear the differentials. A complete interchangeability is afforded between the final drive units at the rear of the vehicle. Bearing in mind that the take off gears in the differential or power apportioning unit must be of limited size so as not to raise the housing to such an extent that it projects into the aisle level, such take off gears must be spaced fairly close to the central differential unit. In fact, the axes of these gears fall between the axes of the parallel shaft sections extending into the final drive units. The axes of these last named units cannot be brought closer together since the desired spacing of the final drive housings to afford a clear central aisle would be destroyed. The slight angularity of the propeller shafts resulting from this relationship of parts is accommodated by the universal joints.

While the invention has been described with specific reference to the accompanying drawings, it is not to be limited, save as defined in the appended claim.

I claim as my invention:

A vehicle comprising a frame, a power shaft offset thereon with respect to the median plane of the frame, final drives mounted at opposite sides of the frame, rearwardly of the shaft, a power apportioning means on the frame, a propeller shaft in line with the first shaft and driving one of the final drives from the apportioning means, and a second propeller shaft symmetric with the first and connecting the apportioning means with the other final drive.

This specification signed this 13th day of January, A. D. 1930.

ERVING R. GURNEY.